(12) United States Patent
Yu et al.

(10) Patent No.: US 12,715,487 B2
(45) Date of Patent: Aug. 25, 2026

(54) METHOD AND DEVICE FOR MEASURING A PARAMETER RELEVANT TO THE JOURNEY OF A RAIL VEHICLE

(71) Applicant: Siemens Mobility GmbH, Munich (DE)

(72) Inventors: Minyi Yu, Maisach (DE); Werner Breuer, Munich (DE); Steffen Jennek, Neuried (DE); Martin Jung, Erlangen (DE)

(73) Assignee: Siemens Mobility GmbH, Munich (DE)

( * ) Notice: Subject to any disclaimer, the term of this patent is extended or adjusted under 35 U.S.C. 154(b) by 188 days.

(21) Appl. No.: 18/694,049

(22) PCT Filed: Aug. 30, 2022

(86) PCT No.: PCT/EP2022/074007

§ 371 (c)(1),
(2) Date: Mar. 21, 2024

(87) PCT Pub. No.: WO2023/046422

PCT Pub. Date: Mar. 30, 2023

(65) Prior Publication Data

US 2024/0383510 A1 Nov. 21, 2024

(30) Foreign Application Priority Data

Sep. 21, 2021 (DE) ..................... 10 2021 210 463.0

(51) Int. Cl.
*B61L 15/00* (2006.01)
*B60L 3/10* (2006.01)

(52) U.S. Cl.
CPC ........... *B61L 15/0058* (2024.01); *B60L 3/106* (2013.01); *B61L 15/0062* (2024.01);
(Continued)

(58) Field of Classification Search
CPC ............. B61L 15/0058; B61L 15/0062; B61L 15/0081; B61L 23/042; B61L 25/021;
(Continued)

(56) References Cited

U.S. PATENT DOCUMENTS

2008/0116739 A1* 5/2008 Lang ..................... B60T 8/1705 303/15
2021/0206358 A1* 7/2021 Danielson ............... B60T 8/175

FOREIGN PATENT DOCUMENTS

DE 4224581 C1 12/1993
DE 4131892 C2 8/1994
(Continued)

OTHER PUBLICATIONS

Christoph Schwarz, Simultaneous Estimation of Wheel-Rail Adhesion and Brake Friction Behaviour, 2020, German Aerospace (Year: 2020).*

(Continued)

*Primary Examiner* — Bickey Dhakal
(74) *Attorney, Agent, or Firm* — Laurence A. Greenberg; Werner H. Stemer; Ralph E. Locher

(57) ABSTRACT

A method for measuring a parameter relevant to a journey of a rail vehicle. A parameter measurement value is determined using a control loop. A vehicle-side torque acting on a rotational part on the vehicle side is ascertained. A calculation module uses the vehicle-side torque value and a frictional engagement torque acting between the rotational part and a rail, to calculate a rotational acceleration of the rotational part and an expected rotational speed. A difference between the rotational estimated value and an actual rotational speed is supplied to a control device which outputs a controller output value at the output side. A frictional engagement torque value is recalculated with the controller output value and is coupled back into the computer module to close the control loop. The controller output and/or the recalculated frictional engagement torque value is considered the parameter measurement value, which is stored or output.

13 Claims, 3 Drawing Sheets

(52) U.S. Cl.
CPC ..... *B60L 2200/26* (2013.01); *B60L 2240/463* (2013.01); *B60L 2240/465* (2013.01)

(58) Field of Classification Search
CPC .......... B61L 3/006; B61L 3/008; B60L 3/106; B60L 2200/26; B60L 2240/463; B60L 2240/465; B60L 2260/44; B60L 15/20; B60L 3/10
See application file for complete search history.

(56) References Cited

FOREIGN PATENT DOCUMENTS

| | | | | | |
|---|---|---|---|---|---|
| DE | 102011011443 | A1 | | 8/2012 | |
| EP | 0656841 | B1 | * | 6/1999 | ................ B60L 3/10 |
| EP | 3680123 | A1 | * | 7/2020 | ................ B60L 9/00 |
| WO | WO-2017175119 | A1 | * | 10/2017 | ................ B60L 3/10 |

OTHER PUBLICATIONS

Senini, S. et al: “Dynamic simulation of wheel-rail interaction for locomotive traction studies”; Proceedings of the IEEE/ASME Joint Railroad Conference. Pittsburgh; 1993.

* cited by examiner

10
Fx
Ma, Mb
V, Ng
200
BRP
BS
211
212
SPM
120
100
110
20
11
12
13

RM
V, Ma, Mb
Mv
M = Ma + Mb
Nb(t) = ∫ t=0 t M(t) - Mx(t - Td) / J dt
M (t - Td)
Nb
DB
Ng
VZB
Td
R*Q*Fx
PID
Ef = Nb - Ng
R
MP2
Fx(t) = Kpid · Ef(t) + Kpid · Kv · dEf(t)/dt + Kpid/Kn ∫ th=0 t Ef(th)dth
Q*Fx
Q
MP1
Fx Fx(X(t))
300
BRP
10
Fx
Ma, Mb
V, Ng
200
BRP
BS
211
212
13
11
12
SPM
120
100
110
20

METHOD AND DEVICE FOR MEASURING A PARAMETER RELEVANT TO THE JOURNEY OF A RAIL VEHICLE

FIELD AND BACKGROUND OF THE INVENTION

The invention relates to a method for measuring a parameter relevant to the journey of a rail vehicle by producing a parameter measurement value.

In the field of rail vehicle technology, the interface between the wheel and the rail plays a major role in the driving behavior of the rail vehicle.

SUMMARY OF THE INVENTION

The object of the invention is to specify a very precise method for determining the wheel-rail frictional engagement.

This object is achieved according to the invention by a method with the features as claimed. Advantageous embodiments of the method according to the invention are specified in dependent claims.

According to the invention, the parameter measurement value is determined using a control loop in which a vehicle-side torque acting on a rotational part, on the vehicle side, traveling on a rail is ascertained, producing a vehicle-side torque value, by means of a calculation module and using the vehicle-side torque value and a frictional engagement torque value which describes a frictional engagement torque acting on the rotational part on the rail side, a rotational acceleration of the rotational part and thereby the expected rotational speed of the rotational part is calculated, producing a rotational estimated value, the actual rotational speed of the rotational part is measured, producing a rotational measurement value, the difference between the rotational estimated value and the rotational measurement value is supplied to a control facility which outputs a controller output value at the output side, the frictional engagement torque value is recalculated with the controller output value and is coupled back into the calculation module to close the control loop and the controller output value of the control facility and/or the recalculated frictional engagement torque value is considered to be the parameter measurement value to be measured, in particular stored or output.

A major advantage of the method according to the invention is that it enables a very precise determination of the frictional engagement between the rotational part and the rail traveled by the rotational part with the help of a few simple method steps as deviations of the measurement value from reality are minimized by the control loop or regulated towards zero.

Using the vehicle-side torque value, M, and the frictional engagement torque value, Mx, the expected rotational acceleration of the rotational part, that is to say, the change dN/dt of the speed N of the rotational part is preferably ascertained for the respective time t, for example in accordance with:

$$|J \cdot dN/dt| = |M(t) - Mx(t - Td)|$$

or $$|dN/dt| = |M(t) - Mx(t - Td)|/J$$

where J denotes the moment of inertia of the rotational part.

With the above equation, the respective speed N or the rotational speed of the rotational part can be calculated in an advantageous manner by integration over time t, producing the rotational estimated value, Nb, in accordance with:

$$Nb(t) = \int_{t=0}^{t} \frac{M(t) - Mx(t - Td)}{J} dt$$

where t=0, for example denotes the time of the start of the journey at which the rail vehicle was stationary and the speed N or the rotational speed was accordingly zero.

The control facility preferably has amplifying, integrating and differentiating properties. The control facility is preferably a PID controller.

It is advantageous if the control facility is configured in such a way that the controller output value output by the control facility corresponds to the coefficient of adhesion between the rotational part and the rail or is at least proportional to the coefficient of adhesion between the rotational part and the rail.

The control facility preferably generates the controller output value in accordance with:

$$Fx(t) = Kpid \cdot Ef(t) + Kpid \cdot Kv \cdot \frac{dEf(t)}{dt} + \frac{Kpid}{Kn} \int_{th=0}^{t} Ef(th)dth$$

where Ef denotes the difference between the rotational estimated value Nb and the rotational measurement value which is supplied to the control facility. Kpid, Kv and Kn denote controller parameters.

The rotational part is preferably a wheel or a set of wheels of the rail vehicle.

Preferably, the vehicle-side torque is determined at least also including a drive-side torque value exerted by the drive on the rotational part.

The drive-side torque value is preferably ascertained using the inertia of a drive train coupling the drive and the rotational part.

Alternatively or in addition, the vehicle-side torque is determined using a braking torque which is produced by a brake. The brake is preferably a friction brake.

With regard to the latter variant, in which the vehicle-side torque is at least also determined as a function of the braking force, it is considered particularly advantageous if the braking torque is determined using a pneumatic pressure which is controlled by a slip controller for controlling the braking force of the brake.

To determine the frictional engagement torque value on the rail side, the controller output value of the control facility is preferably multiplied by a vertical force value, which is determined with the calculation module and indicates the vertical force acting on the rotational part. The vertical force is preferably determined as a function of the driving situation, taking into account the distribution of mass as a function of the driving situation on the wheels of the rail vehicle; alternatively—by accepting a corresponding measurement error—it can be calculated regardless of the distribution of mass as a function of the driving situation, for example by forming a quotient between the total mass of the rail vehicle and the total number of wheels.

The invention also relates to a method for operating a rail vehicle. According to the invention, with regard to the latter method, it is provided that a parameter indicating the frictional engagement between a rotational part and a rail traveled on by the rotational part is measured according to a method as described above, producing a parameter measurement value, and at least one driving and/or braking parameter is adjusted during the journey as a function of the parameter measurement value measured during the journey.

The invention also relates to a method for parameterizing a rail vehicle. According to the invention, with regard to the latter method, it is provided that during a journey on a reference route, a parameter indicating the frictional engagement between a rotational part and a rail traveled on by the rotational part is measured according to a method as described above, producing a multiplicity of parameter measurement values which define a parameter measurement value curve over the reference route, and at least one control or regulating parameter influencing the driving and/or braking behavior of the rail vehicle is ascertained within the framework of journey simulations which are carried out taking into account the parameter measurement value curve for the reference route, and the control or regulating parameter ascertained in this way is used to parameterize the rail vehicle for future journeys.

The invention also relates to a measurement facility for a rail vehicle for measuring a parameter relevant to the journey of the rail vehicle by producing a parameter measurement value. According to the invention, with regard to such a measurement facility, it is provided that the measurement facility is designed in such a way that the parameter measurement value describes the frictional engagement between a rotational part and a rail traveled on by the rotational part, the measurement facility determining the parameter measurement value using a control loop, in which

- a vehicle-side torque acting on the rotational part on the vehicle side is ascertained, producing a vehicle-side torque value,
- by means of a calculation module and using the vehicle-side torque value and a frictional engagement torque value which describes a frictional engagement torque acting on the rotational part on the rail side, a rotational acceleration of a rotational part and thereby the expected rotational speed of the rotational part is calculated, producing a rotational estimated value,
- the actual rotational speed of the rotational part is measured, producing a rotational measurement value,
- the difference between the rotational estimated value and the rotational measurement value is supplied to a control facility which outputs a controller output value at the output side,
- the frictional engagement torque value is recalculated with the controller output value and is coupled back into the calculation module to close the control loop and
- the controller output value of the control facility and/or the recalculated frictional engagement torque value is considered to be the parameter measurement value to be measured, in particular stored or output.

With regard to the advantages of the measurement facility according to the invention and its advantageous embodiments, reference is made to the above statements in connection with the methods according to the invention and their advantageous embodiments. Specifically, the facility can perform all the above method steps individually or in any combination.

The invention also relates to a rail vehicle with a measurement facility as described above.

With regard to the advantages of the rail vehicle according to the invention and its advantageous embodiments, reference is made to the above statements in connection with the methods according to the invention and their advantageous embodiments. Specifically, the rail vehicle can perform all the above method steps individually or in any combination.

The rail vehicle is preferably also equipped with a vehicle control facility which is designed in such a way that it adjusts at least one driving and/or braking parameter as a function of the measured parameter measurement value of the measurement facility during the journey.

It is also advantageous if the rail vehicle is parameterized with at least one control or regulating parameter which has been determined on the basis of a parameter measurement value curve measured for a reference route by the measurement facility.

BRIEF DESCRIPTION OF THE FIGURES

The invention is explained in more detail hereinafter with reference to exemplary embodiments; the diagrams show by way of example FIG. 1 An exemplary embodiment of a rail vehicle according to the invention, which is equipped with an exemplary embodiment for a measurement facility according to the invention, FIG. 2 In the form of a block diagram, the mode of operation of the measurement facility according to FIG. 1 and thus an exemplary embodiment for a method according to the invention, and FIG. 3 An arrangement with a rail vehicle according to the invention, which is equipped with an exemplary embodiment of a measurement facility according to the invention, and an external simulation facility which can simulate journeys over time on the basis of the frictional engagement measurement values measured by the measurement facility and can optimize the driving and/or braking parameters of a vehicle control facility of the rail vehicle for future journeys.

For the sake of clarity, in the figures the same reference characters are always used for identical or comparable components.

DETAILED DESCRIPTION OF THE INVENTION

Figure 1:
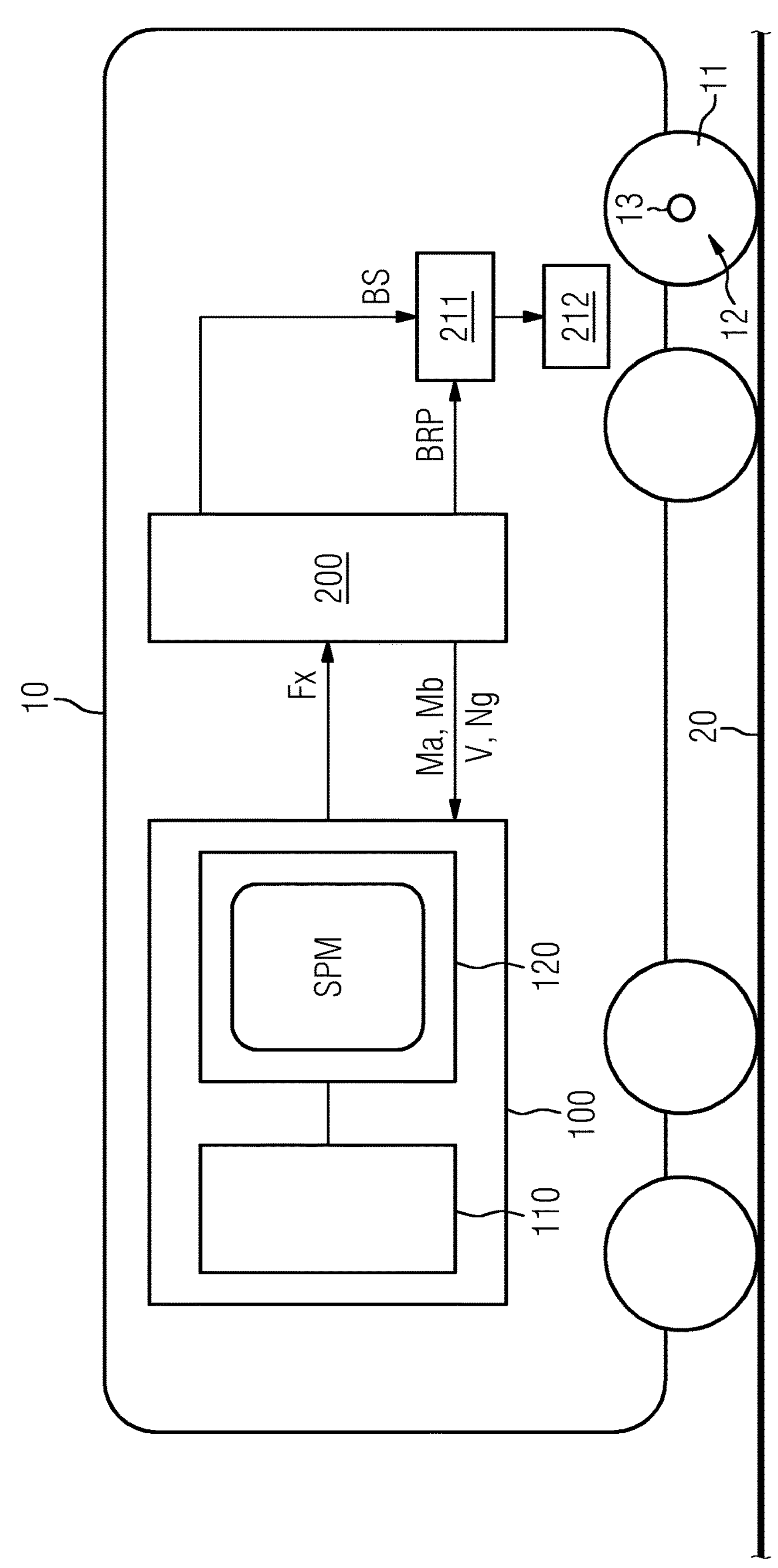

FIG. 1 shows an exemplary embodiment of a rail vehicle 10 which is equipped with a measurement facility 100 for measuring a parameter relevant to the journey of the rail vehicle 10 by producing a parameter measurement value.

In the exemplary embodiment according to FIG. 1, the measurement facility 100 measures the coefficient of adhesion Fx between a rotational part and a rail of a rail section 20 traveled on by the rail vehicle 10 as a parameter measurement value. The rotational part can be, for example, the wheel characterized by the reference character 11 in FIG. 1 or a set of wheels 12 comprising the wheel 11, an axle 13 connected to the wheel 11 and a second wheel (concealed and not visible in FIG. 1) likewise connected to the axle 13. The measurement facility 100 can thus also be referred to as a coefficient of adhesion measurement facility.

A vehicle control facility 200 is connected to the measurement facility 100 which records and evaluates the coefficients of adhesion Fx of the measurement facility 100 during the journey. For example, the vehicle control facility 200 can adjust at least one driving and/or braking parameter as a function of the measured coefficients of adhesion Fx of the measurement facility 100 and/or store the measured coefficients of adhesion Fx for later evaluation.

The measurement facility 100 comprises a computing facility 110 and a memory 120, in which a software module SPM is stored. The software module SPM determines the operation of the measurement facility 100 when executed by the computing facility 110.

Figure 2:
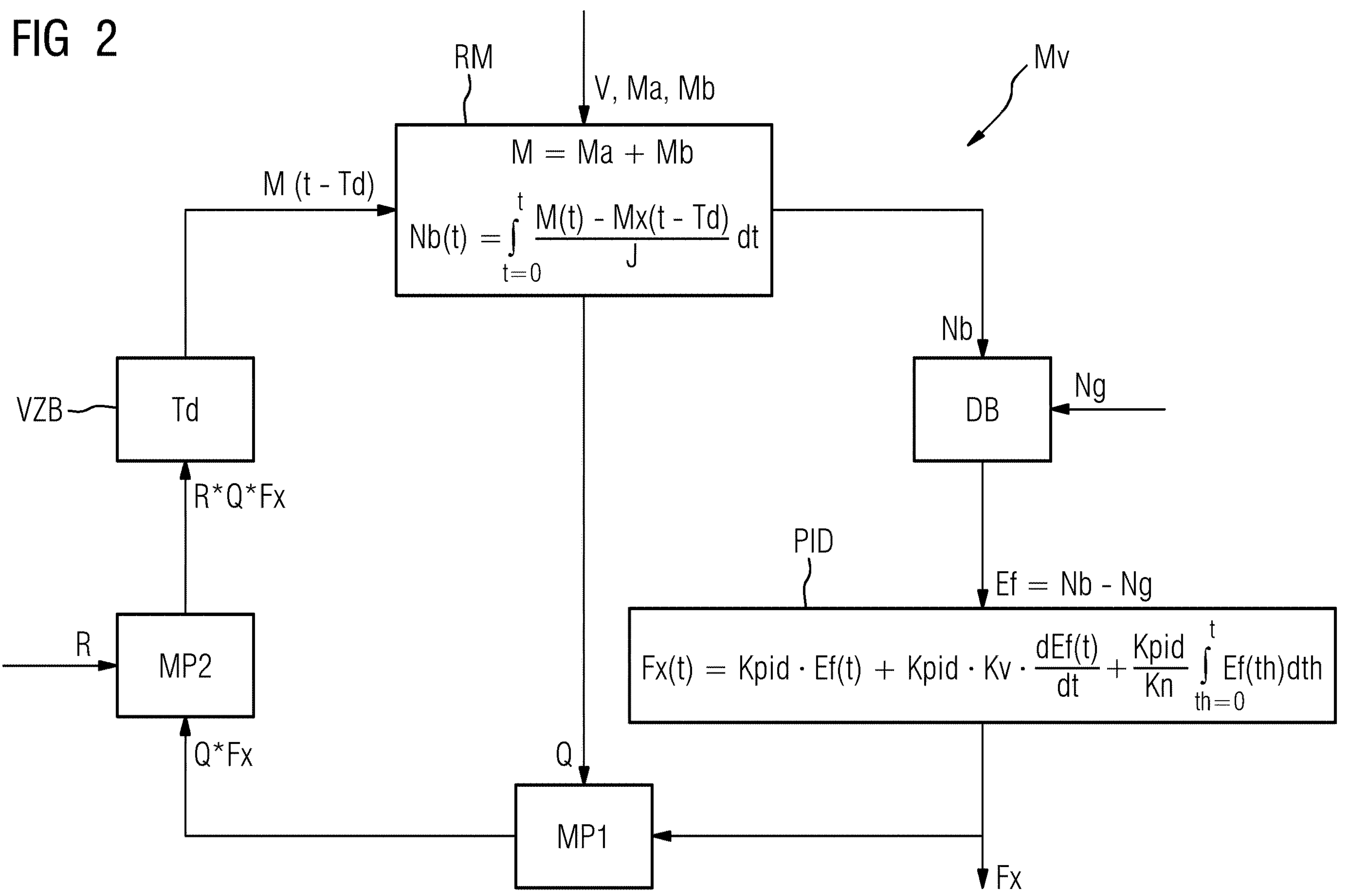

When the software module SPM is actively operated by the computing facility 110, the measurement facility 100 preferably performs a measurement method Mv, as shown in the form of a block diagram in FIG. 2 by way of example.

In the exemplary embodiment according to FIG. 2, it is assumed that the coefficient of adhesion Fx of the wheel 11 is measured, so that the subsequent measurement method Mv is in relation to the wheels with regard to mass inertia and the forces and torques to be taken into account. Alternatively, the measurement facility 100 can also work in relation to the set of wheels 12; in the latter case, the subsequent measurement method Mv would have to be carried out with regard to the values for mass inertia, forces and torques in relation to the set of wheels but would otherwise be identical.

As part of the measurement method Mv, a control loop RS is repeatedly passed through.

Each time the control loop RS is passed through, a calculation module RM is used to determine a vehicle-side torque acting on the wheel 11, producing a vehicle-side torque value M, which can change during the journey and thus depends on the time t, and in each case using

- a braking torque Mb measured or estimated for the wheel 11, which is exerted by a brake assigned to the wheel 11, preferably a friction brake, 212 (cf. FIG. 1), and
- a drive torque Ma measured or estimated for the wheel 11, which is exerted on it by a drive assigned to the wheel 11 (not shown) and the sign of which is dependent on the operation (generator operation positive sign, engine operation negative sign), preferably in accordance with:

$$M(t) = Ma(t) + Mb(t)$$

The braking torque Mb and the drive torque Ma or their quantitative values can be provided, for example, by the vehicle control device 200, as shown by way of example in FIG. 1; alternatively, these quantitative values can also be detected and supplied by separate sensors, which are not shown in FIG. 1.

Using the time-dependent vehicle-side torque value M(t), the calculation module RM can then ascertain the change dN/dt of the speed N of the wheel 11 for the respective time t in accordance with:

$$|J \cdot dN/dt| = |M(t) - Mx(t - Td)|$$

or $$|dN/dt| = |M(t) - Mx(t - Td)|/J$$

where J denotes the moment of inertia of the wheel 11.

Mx(t−Td) denotes a frictional engagement torque value supplied to the calculation module RM, which describes the frictional engagement torque acting on the wheel 11 on the rail side and has been ascertained at an earlier time t−Td (in the previous loop cycle of the control loop RS). Td denotes the delay time of the control loop RS and is symbolized by a delay block VZB in FIG. 2. In other words, Mx(t−Td) was therefore determined as the frictional 9 engagement torque value at the end of the last loop cycle of the control loop RS and is used by the calculation module RM at the current time t.

Using the above equation, $$|dN/dt| = |M(t) - Mx(t - Td)|/J$$

the respective speed N or the rotational speed of the wheel can be calculated by integration over time t, producing a rotational estimated value Nb in accordance with:

$$Nb(t) = \int_{t=0}^{t} \frac{M(t) - Mx(t - Td)}{J} dt$$

where t=0, for example denotes the time of the start of the journey at which the rail vehicle 10 was stationary and the rotational speed was accordingly zero.

Subsequently, as part of the control loop RS, the difference Ef(t) between a measured rotational measurement value Ng(t), which indicates the actual speed N of the wheel 11, and the rotational estimated value Nb(t) is calculated with a difference former DB. The rotational measurement value Ng can be provided by the vehicle control device 200, as shown by way of example in FIG. 1; alternatively, the rotational measurement value Ng can also be supplied by a separate sensor, which is not shown in FIG. 1.

The difference Ef(t) is supplied to a control facility PID, for example a PID controller, the behavior of which has amplifying (P), integrating (I) and differentiating (D) properties. The control facility PID generates a controller output value at the output side which is proportional to the slip-dependent friction between the wheel and the rail and forms a coefficient of adhesion Fx(t) or is at least proportional thereto, for example in accordance with:

$$Fx(t) = Kpid \cdot Ef(t) + Kpid \cdot Kv \cdot \frac{dEf(t)}{dt} + \frac{Kpid}{Kn} \int_{th=0}^{t} Ef(th)dth$$

The parameters Kpid, Kv and Kn are preferably in the following ranges:

$$0.03 \leq Kpid \leq 0.3$$

$$0.001 \leq Kv \leq 0.006$$

$$0.15 \leq Kn \leq 1.5$$

The controller output value or the coefficient of adhesion Fx(t) is then multiplied by the vertical force Q (or a value quantitatively indicating the vertical force Q) by means of a first multiplier MP1 and by the radius R of the wheel 11 by means of a second multiplier MP2.

The vertical force Q is preferably calculated in the driving situation and thus as a function of time by means of simulation of the distribution of mass in the rail vehicle 10, as the distribution of mass can alter depending on the driving situation (braking/acceleration/driving resistance) and thus also the vertical force Q individually for each wheel; the simulation of the distribution of mass preferably takes place in the calculation module RM. Alternatively, the vertical force Q can also be regarded as constant and be determined by dividing the total mass of the rail vehicle 10 by the total number of wheels.

This results in a new frictional engagement torque value $$Mx(t) = Q \cdot R \cdot Fx(t)$$

which replaces the previous frictional engagement torque value Mx(t−Td) taken into account in the current loop cycle of the control loop RS and is used for the next loop cycle of the control loop RS instead of the old frictional engagement torque value Mx(t−Td).

In addition, when ascertaining the vehicle-side torque value M—using a speed value V indicating the speed of the rail vehicle 10—the respective driving resistance Fw can be taken into account, which supports braking but counteracts acceleration, and is therefore to be included with the correct sign when ascertaining the vehicle-side torque value M, for example in accordance with:

$$M(t) = Ma(t) + Mb(t) + Mf(t) = Ma(t) + Mb(t) + (Fw \cdot V(t) \cdot Q(t) \cdot R)$$

In all other respects, the above statements shall apply accordingly.

Returning to FIG. 1, it is advantageous if the vehicle control facility 200 adjusts, or is at least able to adjust, at least one driving and/or braking parameter during the journey as a function of the measured coefficient of adhesion Fx of the measurement facility 100.

Such a change or adjustment to the measured coefficient of adhesion Fx of the measurement facility 100 is particularly advantageous if the currently measured coefficients of adhesion Fx deviate from coefficients of adhesion stored in the vehicle control facility 200 which have been detected during one or more previous journeys on the same route 20, and better vehicle control is thus to be expected on the basis of the currently measured coefficients of adhesion Fx.

It is advantageous, for example, if as a function of the measured coefficients of adhesion Fx, the vehicle control facility 200 modifies a braking parameter, preferably a regulating parameter BRP for a slip controller 211, which acts on the brake 212 assigned to the wheel 11 and controls its braking force. The brake 212 can be actuated—independently of indirect influence by the regulating parameter BRP—from the vehicle control facility 200 by means of a brake control signal BS.

It is also advantageous if the vehicle control facility 200, for example as the driving parameter or as one of the driving parameters, specifies a maximum driving force for the drive, which is to act on the wheel 11; for example, the driving force can be reduced if the measured coefficient of adhesion is less than expected.

Figure 3:
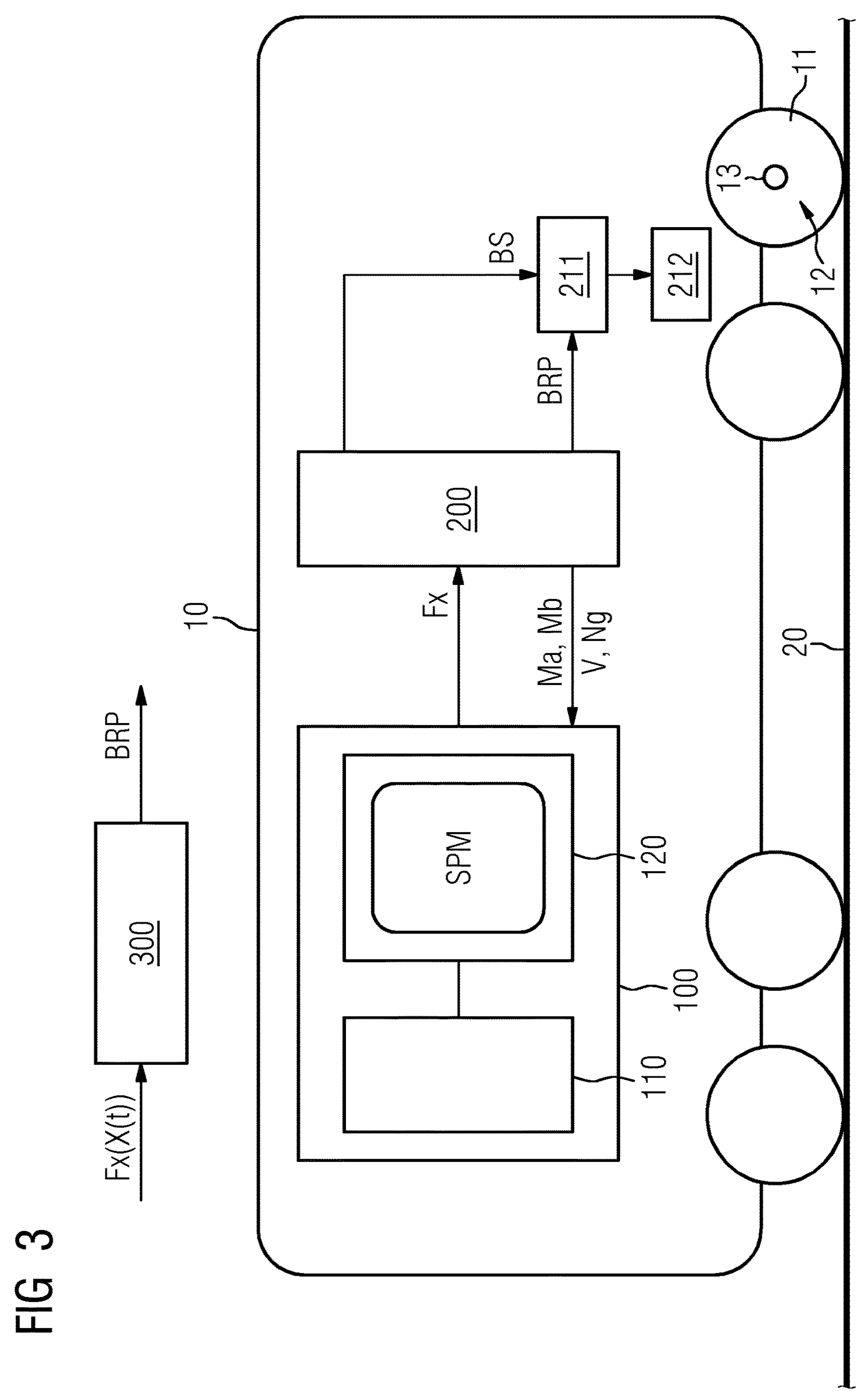

Alternatively or in addition, the vehicle control facility 200 and/or the measurement facility 100 can store the measured coefficients of adhesion Fx as a function of the respective traveled route point X of the route 20 traveled, that is to say, in the form Fx(X(t)). In the latter case, by means of further simulation—for example with an external simulation facility 300 as shown in FIG. 3—the journey of the rail vehicle 10 on the same route 20 at a later point in time can be reproduced or simulated. In the context of such simulated journeys, for example, the driving and/or braking parameters of the vehicle control facility 200 can be optimized for future journeys on the same route 20 in order to optimally adjust the vehicle control to the actual route conditions.

The measurement facility 100 and its measurement method for measuring a parameter relevant to the journey of the rail vehicle 10 can also be used for other, for example for all other wheels (driven or non-driven wheels) of the rail vehicle 10 in identical or comparable form.

Although the invention has been illustrated and described in more detail by preferred exemplary embodiments, the invention is not limited by the disclosed examples and other variations may be derived therefrom by a person skilled in the art without departing from the scope of the invention.

The invention claimed is:

1. A method for measuring a parameter that is relevant to a journey of a rail vehicle by producing a parameter measurement value, the method comprising:

determining the parameter measurement value using a control loop, and thereby:

ascertaining a vehicle-side torque acting on a rotational part on a vehicle side, to produce a vehicle-side torque value;

by way of a calculation module and using the vehicle-side torque value and a frictional engagement torque value which describes a frictional engagement torque acting on the rotational part on a rail side, calculating a rotational acceleration of the rotational part and an expected rotational speed of the rotational part, to produce a rotational estimated value;

measuring an actual rotational speed of the rotational part, to produce a rotational measurement value;

supplying a difference between the rotational estimated value and the rotational measurement value to a control facility and outputting by the control facility a controller output value at an output side, the controller output value being an initial estimated value that corresponds to a coefficient of adhesion between the rotational part and a rail or an initial estimated value that is at least proportional to the coefficient of adhesion between the rotational part and the rail;

recalculating the frictional engagement torque value with the controller output value and coupling back the recalculated frictional engagement torque value into the calculation module to close the control loop;

considering at least one of the controller output value of the control facility or the recalculated frictional engagement torque value to be the parameter measurement value to be produced, and storing or outputting the parameter measurement value; and providing the parameter measurement value to a vehicle control facility of the rail vehicle and adjusting, with the vehicle control facility, at least one driving and/or braking parameter during the journey as a function of the parameter measurement value.

2. The method according to claim 1, wherein a respective speed of the rotational part is calculated by forming the rotational estimated value Nb in accordance with:

$$Nb(t) = \int_{t=0}^{t} \frac{M(t) - Mx(t - Td)}{J} dt$$

where Nb is the rotational estimated value, J is the moment of inertia of the rotational part, M is the vehicle-side torque value, and Mx is the frictional engagement torque value.

3. The method according to claim 1, wherein the control facility is configured with amplifying, integrating and differentiating properties and generates the controller output value in accordance with:

$$Fx(t) = Kpid \cdot Ef(t) + Kpid \cdot Kv \cdot \frac{dEf(t)}{dt} + \frac{Kpid}{Kn} \int_{th=0}^{t} Ef(th)dth$$

where Ef is the difference between the rotational estimated value and the rotational measurement value supplied to the control facility, and Kpid, Kv, and Kn are the controller parameters.

4. The method according to claim 1, wherein the control facility is a proportional-integral-derivative controller.

5. The method according to claim 1, wherein the rotational part is a wheel or a set of wheels of the rail vehicle.

6. The method according to claim 1, wherein the step of ascertaining the vehicle-side torque comprises determining the vehicle-side torque using a drive-side torque exerted by a drive on the rotational part or using a braking torque produced by a brake on the rotational part.

7. The method according to claim 6, which comprises determining the vehicle-side braking torque using a pneumatic pressure, which is controlled by a slip controller for controlling the braking force of a brake assigned to the rotational part.

8. The method according to claim 1, wherein the step of recalculating the frictional engagement torque value to determine the frictional engagement torque value on the rail side, the controller output value of the control facility is multiplied by a vertical force value which indicates the vertical force acting on the rotational part.

9. A method for parameterizing a rail vehicle, the method comprising:

carrying out the method according to claim 1 during a journey of the rail vehicle on a reference route, to measure a parameter indicating a frictional engagement between a rotational part and a rail being traveled on by the rotational part, and producing a multiplicity of parameter measurement values which define a parameter measurement value curve over the reference route; and determining at least one control or closed-loop control parameter influencing at least one of a driving behavior or a braking behavior of the rail vehicle in a context of driving simulations which are carried out taking into account the parameter measurement value curve for the reference route, and parameterizing the rail vehicle for future journeys with the control or closed-loop parameter thus determined.

10. A measurement facility for a rail vehicle for measuring a parameter that is relevant to a journey of the rail vehicle by producing a parameter measurement value, the measurement facility comprising:

a control facility configured to form the parameter measurement value that describes a frictional engagement between a rotational part and a rail traveled on by the rotational part, and to determine the parameter measurement value using a control loop, the control facility being configured to:

ascertain a vehicle-side torque acting on the rotational part on a vehicle side, producing a vehicle-side torque value;

calculate, by way of a calculation module and using the vehicle-side torque value and a frictional engagement torque value which describes a frictional engagement torque acting on the rotational part on the rail side, a rotational acceleration of the rotational part and thereby an expected rotational speed of the rotational part, producing a rotational estimated value;

measure an actual rotational speed of the rotational part, producing a rotational measurement value;

supply a difference between the rotational estimated value and the rotational measurement value to a control facility which outputs a controller output value at an output side, the controller output value being an initial estimated value that corresponds to a coefficient of adhesion between the rotational part and a rail or an initial estimated value that is at least proportional to the coefficient of adhesion between the rotational part and the rail;

recalculate the frictional engagement torque value with the controller output value, the recalculated frictional engagement torque value being coupled back into the calculation module to close the control loop;

consider the controller output value of the control facility and/or the recalculated frictional engagement torque value be the parameter measurement value to be measured; and provide the parameter measurement value to a vehicle control facility of the rail vehicle, the vehicle control facility configured to adjust at least one driving and/or braking parameter during the journey as a function of the provided parameter measurement value.

11. The measurement facility according to claim 10, configured to store or output the parameter measurement value.

12. A rail vehicle, comprising the measurement facility according to claim 10.

13. The rail vehicle according to claim 12, wherein the rail vehicle is parameterized with at least one control or closed-loop parameter which has been determined on a basis of a parameter measurement value curve measured for a reference route by the measurement facility.

* * * * *